United States Patent [19]

Honey et al.

[11] Patent Number: 4,658,572
[45] Date of Patent: Apr. 21, 1987

[54] TRACTOR MOUNTED SWATHER

[75] Inventors: Gregory J. Honey; Glenn R. Honey, both of Bracken, Canada

[73] Assignee: Honey Bee Manufacturing Ltd., Bracken, Canada

[21] Appl. No.: 745,248

[22] Filed: Jun. 14, 1985

[51] Int. Cl.[4] .............................................. A01B 73/00
[52] U.S. Cl. .................................... 56/228; 172/386; 280/415 R
[58] Field of Search .................. 56/192, 228; 280/411, 280/412, 415, 462, 463; 172/313, 314, 383, 386, 324, 328

[56] References Cited

U.S. PATENT DOCUMENTS

| 4,455,034 | 6/1984 | de Graff et al. | 56/228 X |
| 4,460,193 | 7/1984 | Dietz et al. | 280/415 R |
| 4,555,897 | 12/1985 | Degelman | 56/228 |
| 4,573,309 | 3/1986 | Patterson | 56/228 |

Primary Examiner—John D. Yasko
Attorney, Agent, or Firm—Mason, Fenwick & Lawrence

[57] ABSTRACT

A multi-head swather for mounting on a tractor, and having a main frame including a front transverse member, a pair of side members and an intermediate transverse member each detachably connectable with the tractor. A front swather head is carried by the front transverse member and a mounting mechanism connects a side swather head to one of the side members for swinging movement between a laterally extending operative position and a trailing travel position. A rear frame structure is attachable to the tractor behind the main frame and provides a connection for a removable strut which extends forwardly to a connection on the side swather spaced outwardly of the mounting mechanism of the side swather arm.

17 Claims, 6 Drawing Figures

TRACTOR MOUNTED SWATHER

BACKGROUND OF THE INVENTION

This invention relates to an agricultural swather, and more particularly to a multi-head swather.

In order to increase the efficiency in swathing grain crops and to make it possible to optionally place the grain cut from a wider swath into a single windrow, swathers consisting of a single machine carrying more than one head have been developed. Such machines are capable of cutting a swath which is far wider than roadways and other locations which must be accessed by the machine and, accordingly, it has been neccessary to design the machines so that the heads can be adjusted from a work position to a travel position. It has also been proposed to provide a plurality of swather heads which can be mounted on a conventional farm tractor in a manner which will make it possible to readily attach the heads for the swathing season and then subsequently remove the swather from the tractor so that it can be continued to be used as a tractor when the swathing has been completed. As is shown in pending Canadian Patent Application Ser. No. 460,338, filed Aug. 3, 1984, there exist tractor mounted swathers which include a framework for attachment to the frame of a tractor, the framework carrying a front head with at least one side head being connected to one side of the framework. In such an arrangement the side head is connected to the framework in a manner to permit the head to swing from a swathing condition to a position in which it trails so as to reduce the total width of the machine and thus making it possible for the swather, while mounted on the tractor, to be driven along roadways, into farmyards, through fence openings, etc. Because the side swather head may extend outwardly from the side of the framework more than twenty feet when in an operative position, forces which developed at the connection between the side head and the framework and as a result in the frame work itself during operation can be significant. It is, nevertheless, desirable to provide a connection which will permit the movement between the operative condition and the travel position quickly and with as little work as possible by the operator. Known structures are relatively complex or have proven not to be sufficiently rugged.

It has been found that in order to enhance the maneuverability of the machine, particularly when it is in the operative mode, it is preferable for the inner end of the side head to be supported solely by the the framework which is carried by the tractor. With this type of an arrangement, the load carrying ability of the connection is again increased.

SUMMARY OF THE INVENTION

It is an object of the present invention, to provide a tractor mounted swather having a frame structure capable of coping with stresses encountered in operation and provided with a side head connection of simple construction which permits satisfactory maneuvering of the machine and ready adjustment between work and travel modes.

According to the present invention, there is provided a swather for mounting on a tractor unit, the swather including a main frame which has a front transverse member, a pair of rearwardly extending side members and an intermediate transverse member. The front transverse member has connecting means for detachably securing the front transverse to the front of the tractor unit, and the side members are secured at forward ends thereof to the front transverse and are spaced so as to be disposed on opposite sides of the tractor unit. The intermediate transverse member has connecting means between opposite ends thereof for detachably securing it beneath the tractor unit, the outer ends of the intermediate transverse member being secured to the side members. A front swather head is carried solely by the front transverse member, and at least one side swather head has its inner end carried by one of the side frame members. Mounting means connects the side swather head to the side member in a manner to permit the swinging of the side swather head between an operative position, wherein the side swather head projects outwardly from the side member and the inner end thereof is located behind and substantially in line with an outer end of the front swather head, and a travel position, wherein the side swather head is substantially parallel to the direction of travel of the tractor unit. A rear frame structure is attachable to the tractor unit and provides a strut connection means rearwardly of the side swather head mounting means, a rigid strut member in an operative position is connected at a rear end therof to the strut connection and extends forwardly to a connecting means on the side swather head located outwardly of the side swather head mounting means when the side swather head is in the operative position.

More specifically, the mounting means of the side swather head includes pivot means providing a substantially vertical hinge axis for the side swather head adjacent to the one side member for permitting swinging of the side swather head at least through approximately 90 degrees, the side swather head in the operative position projecting substantially at a right angle relative to the side member and in the travel position being adjacent to and approximately parallel to the side member.

In a preferred embodiment of the invention, the strut member is removably connectable into the operative position between the connecting means of the rear frame structure and the side swather head, the strut in the operative position providing a compression link during forward travel of the swather to thereby prevent the side swather head from swinging to the travel position.

BRIEF DESCRIPTION OF THE DRAWINGS

In the accompanying drawings, which illustrate an embodiment of the invention, by way of an example.

DESCRIPTION OF PREFERRED EMBODIMENTS

Figure 1:
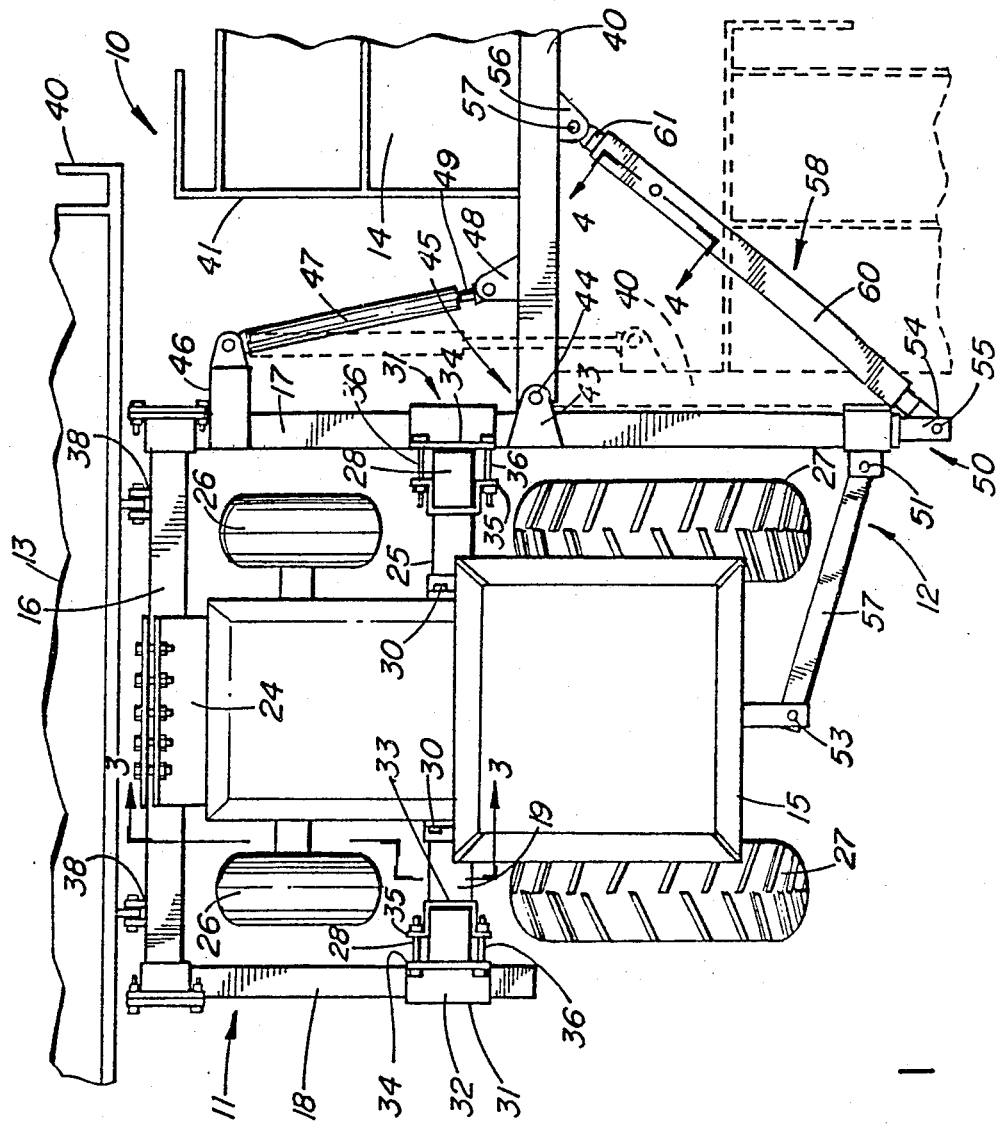
FIG. 1 is a top plan view of the swather of the present invention mounted on a conventional tractor with the side swather head in an operative position but showing the side head in a travel position by way of dashed lines.

In FIG. 1, the reference number 10 generally denotes the swather of the present invention, the swather including a main frame structure 11 and a rear frame structure 12, with a front swather head 13 carried in front of the main frame structure 11 and a side swather head 14 connected to the right hand side of the main frame structure 11. It may be appreciated that the main frame structure 11 may be modified so that the left hand side is a mirror image of the right hand side so that a second side swather head (not shown) may be mounted on the left hand side.

The main frame structure is shown as consisting of a plurality of heavy tubular members of square cross section which may be initially produced and shipped as separate pieces but after initial assembly by the purchaser they would not normally have to be disassembled when mounting and demounting on the prime mover, hereinafter referred to as the tractor unit and which is shown in FIG. 1 as a conventional agricultural tractor 15. The main frame structure includes 4 main pieces or components; namely, a front transverse member 16, a pair of side members 17, 18 and an intermediate transverse member 19. The front transverse member 16 is a straight member which has U-shaped members 20 secured, as by welding, to opposite ends thereof, the U-shaped members having an internal shape for closely receiving the front ends of side members 17 and 18 and being provided with lateral flanges 21. The front ends of the side members have flat plates 22 secured, as by welding, to the outer sides thereof and bolts 23 pass through aligned openings in the plates 22 and the flanges 21 thus providing clamps for fastening the front ends of the side members 17,18 to the front transverse member 16. As may be seen from FIG. 1, the side members are parallel to each other and are spaced to extend rearwardly along opposite sides of the tractor and outside of the front wheels 26,26. Attached to the rear side of the front transverse member 16 at a midpoint thereof is a mounting bracket 24 which provides one of the connecting means for detachably fastening the main frame structure to the tractor 15. The intermediate transverse member 19 is of shallow U-shaped configuration defined by a straight base portion 25 adapted to extend beneath the tractor 15 between the front wheels 26 and rear wheels 27 of the tractor and upwardly projecting ends 28,28. Upwardly projecting brackets 30,30 are fixed to the base portion 25 of the intermediate transverse member 19 which are spaced to allow bolting to the opposite sides of the tractor thus providing additional connecting means for mounting the main frame structure to the tractor. Clamps 31 are provided at the outer ends of the intermediate transverse member 19 for fastening the side members 17 and 18 thereto. Each clamp 31 includes an outer U-shaped member 32 shaped to closely receive the respective side member and an inner U-shaped member 33 shaped to closely receive the upwardly projecting end of the intermediate transverse member 19. U-shaped member 32 has lateral flanges 34, and U-shaped member 33 has lateral flanges 35, the flanges 34 and 35 having aligned openings at the corners thereof for receiving bolts 36 which pull the side members into close attachment with the intermediate transverse member.

Figure 2:
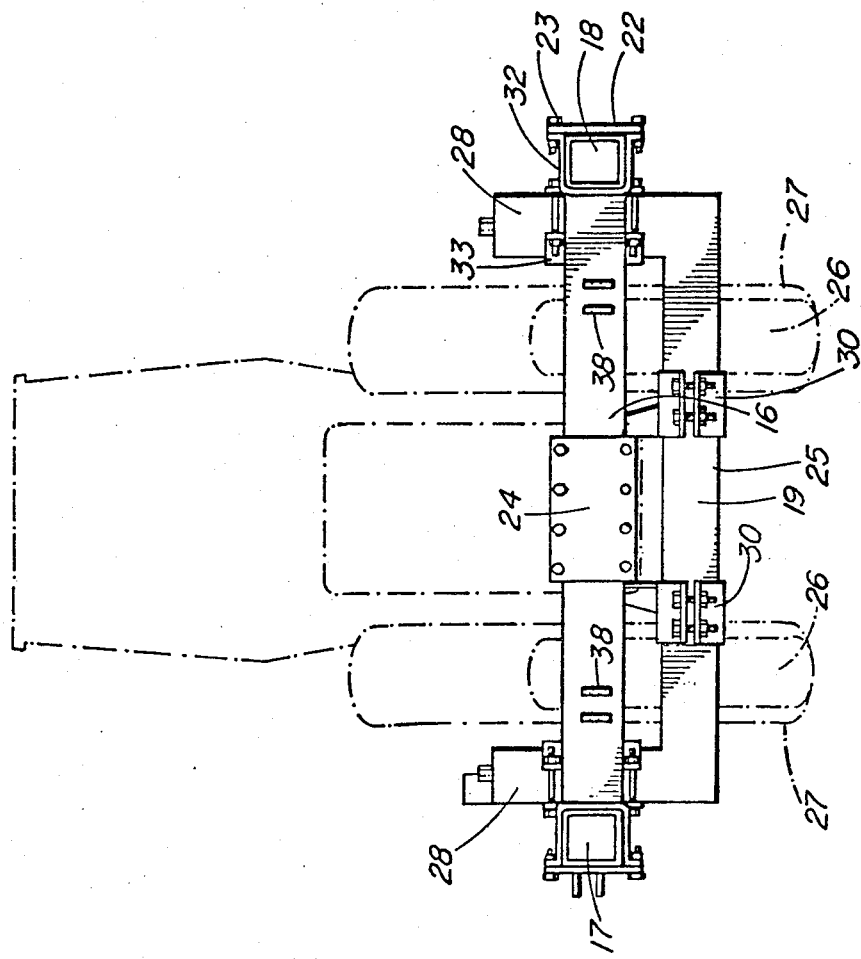
FIG. 2 is a front view of the main frame only of the swather of FIG. 1 and showing its relation to the tractor when in a mounted condition.
Figure 3:
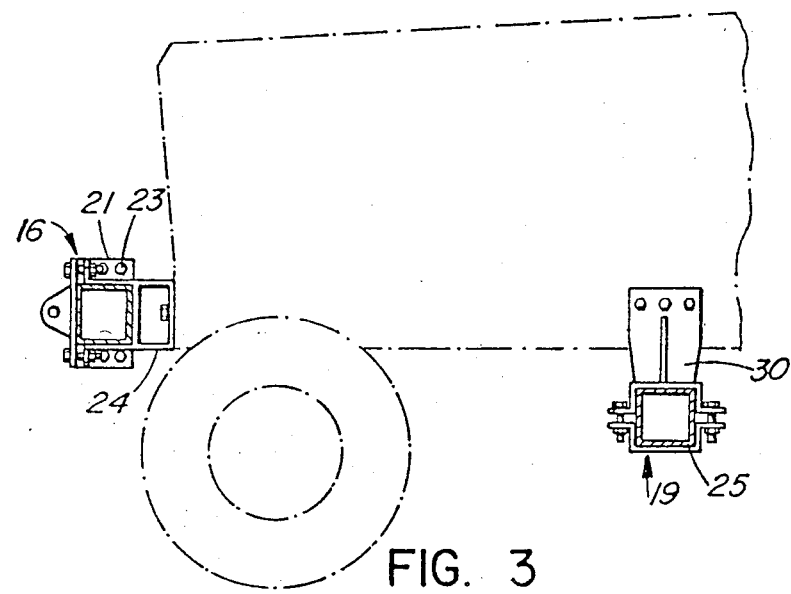
FIG. 3 is a cross sectional view as seen from the line 3—3 of FIG. 1.

On the front face of front transverse member 16 there is provided two pairs of lugs 38 (FIGS. 1 and 2) which provide an pivot connection for the front swather head 13. The front swather head is supported solely by the front transverse member 16 and there are provided hydraulic cylinders (not shown) for controlling the height adjustment of the front swather head. The side swather head has a rear main frame member 40 thereof which is connected to side member 17 so that an inner end 41 of the side swather head is behind and substantially aligned with an outer 42 of the front swather head 13. The side member 17 is provided with an outwardly projecting bracket 43 behind the clamp 31, and a pin 44 provides a vertical pivot connection 45 between the inner end of the frame member 40 of the side swather head 14. In the illustrated embodiment the pivot connection at the inner end of the side swather head provides the only connection support for that end of the swather head, but the outer end of the side swather head is carried by a ground engaging means, such as a caster wheel (not shown). The pivot connection 45 may further include a horizontal pin (not shown) to accommodate pivoting of the side swather head about a horizontal axis. Located forward of the clamp 31 and secured to the side member 17 is a bracket 46 which projects laterally and provides a pivot connection for the forward end of a control cylinder 47. Intermediate the inner end of the side swather head 14 and the pivot connection 45 is a bracket 48 fixed to and projecting forwardly of the rear frame 40 of the side swather head. A piston rod 49 of the control cylinder is pivotally connected to the bracket 48. The control cylinder is of a selected length relative to the spacing of brackets 47 and 48 so as to be able to draw the side swather head to the operative position shown in full lines in FIG. 1 before the cylinder reaches its fully contracted position, and as the cylinder moves to its extended position, the side swather heads swings to a travel position shown in dashed lines. In the work mode or operative position the side swather head projects substantially at a right angle relative to the side frame member 17, and in the travel mode, the said swather head trails in a position substantially parallel to the direction of travel of the tractor, i.e. parallel to the side member 17.

Figure 4:
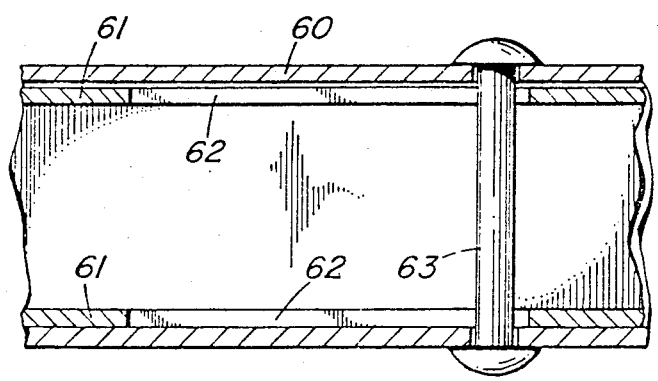
FIG. 4 is a sectional view as seen from line 4—4 of FIG. 1.

In the embodiment shown in FIG. 1 the rear frame structure includes a rearward extension of the side member 17. A rear end portion 50 formed by the extended portion of the side member is positioned behind the rear wheel 27 of the tractor and includes means providing a pivot connection 51 for a stabilizer member 52 in the form of a rigid member extending diagonally forward from the pivtot connection 51. The stabilizer member has a forward end therof connected to the tractor and in the illustrated embodiment it is shown connected to a conventional drawbar of the tractor by way of a pin 53. The rear end portion has fixed thereto a bracket 54 which has vertically aligned openings for receiving a hinge pin 55. A bracket 56 also having aligned openings for receiving a hinge pin 57 is fixed to the rear surface of rear frame member 40 of the side swather head. The bracket 56 is located outwardly of the pivot conection 45. In the operative condition of the side swather head 14, a strut 58 has its opposite ends connected to the rear end portion 50 by hinge pin 55 and to the side swather head 14 by hinge pin 57. The strut 58 is rigid at least insofar that it acts as a compression link between the rear frame structure 12 and the side swather head during forward travel, holding the side swather head at a right angle to the side member 17. The strut 58 is formed by two tubular members 60 and 61, which may be of square cross section, with the smaller one telescoped inside of the other. The inner tubular member 61 is provided with an elongated slots 62 in opposite sides thereof, and a pin 63 is received in aligned openings in the outer member 60 and extends diametrically across the hollow tubes and through slots (FIG. 4). Engagement of the pin 63 with the end of the slots limits the amount of relative axial movement of the two members 60 and 61. In the relative positions of members 60 and 61 shown in FIG. 4, with the pin engaging the one end of the slot, the strut 58 provides the rigid compression link described for in effect pushing the side swather head from the rear frame structure. However, by further contracting the control cylinder 47, the side swather head can be swung further forward because the strut 58 can be further extended until the pin 63 engages the opposite end of the slots 62. This type of movement can be useful because as the side swather head is swung further forward, the outer end of the head swings inward relative to the tractor and this movement may be used if, for example, it is desired to avoid an obstacle near the outer end of the side swather head.

Figure 5:
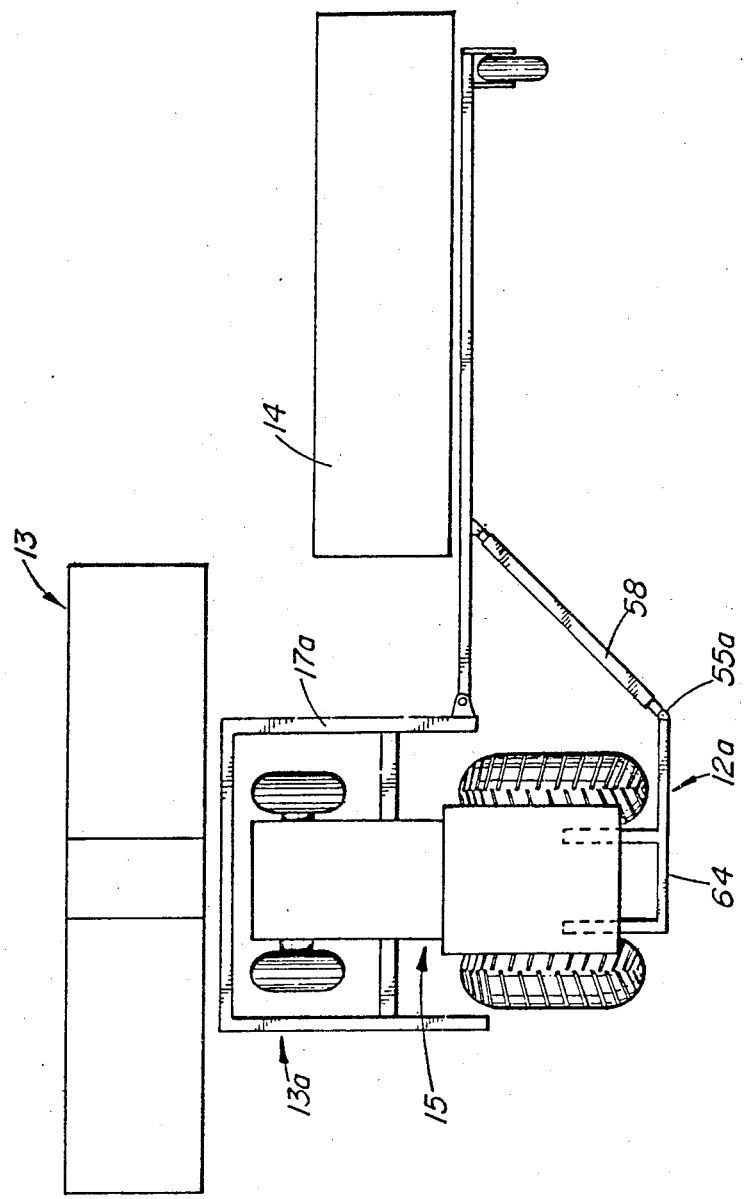
FIG. 5 is a plan view similar to FIG. 1, but showing an alternative form of a rear frame structure.

In the embodiment shown in FIG. 5, the main or front frame structure 13a is different than the member 13 of the previous embodiment in that the side member 17a does not extend rearwardly of the pivot connection of the side swather head. The rear frame is provided by a completely separate structure 12a which may be bolted to the rear of the tractor and extends to beyond the rear wheels of the tractor. The structure 12a and has a transverse member 64 providing a pivot connection 55a for the strut 58 which extend diagonally forward therefrom in the same manner as the strut of the previous embodiment.

Figure 6:
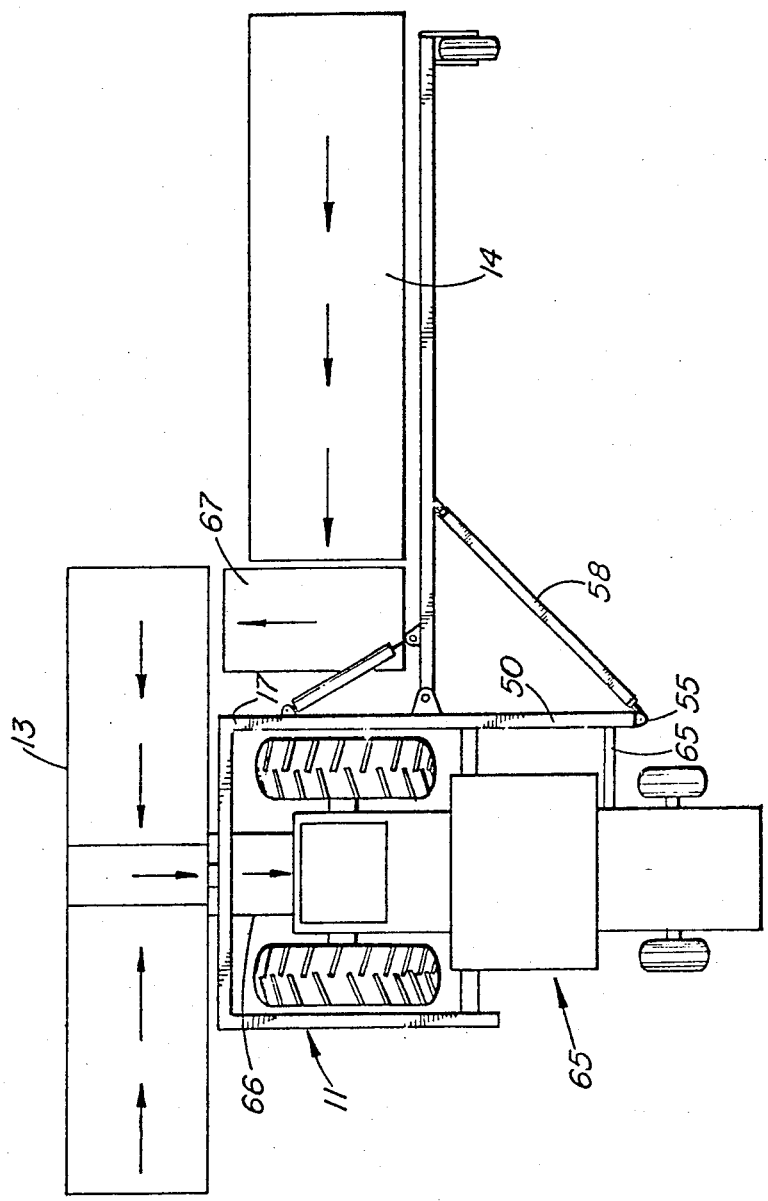
FIG. 6 is a plan view of a swather incorporating the present invention but of a type which can be utilized on a combine.

The embodiment of the swather shown in FIG. 6 is adapted to be mounted on a basic combine unit 65, and the term tractor unit as used herein includes units such as power driven combines. The front frame stucture 11 is substantially identical to that of the first embodiment with the side member 17 having a rear end portion 50. However, in place of the diagonal member 52 of the first embodiment, there is provided a rigid stabilizer member fixed at one end to the combine body and extending laterally to the rear portion 50. The front swather head is provided with a conveying bed for moving the cut grain to the middle thereof, and a short conveyor 66 feeds the grain into the front of the combine. The side swather head has a conveying bed for feeding all of the grain cut thereby to its inner end, and a short conveyor 67 is provided for feeding the cut grain from the side swather head forwardly to the front washer head so that it is carried along to the centre of the front swather head with the other grain cut at that side of the front swather head. The conveyor 67 is carried by a framework (not shown) which is mounted either on the front frame structure 11 or the frame of one of the two swather heads.

When the operator of the swather wishes to move his machine from the field where he has been swathing or combining as in the case of the embodiment of FIG. 6, it is necessary for him to disconnect the strut 58, and either pin 55 or 57 or both are of a type which can be easily withdrawn. For example, if the forward pin 57 is pulled, the strut 58 can be swung about pin 55 to a trailing position. When the control cylinder 47 is expanded, the side swather head swings to a travel position. To return the swather to the operative mode the above steps are simply reversed.

Other embodiments which are within the spirit of the invention as defined in the appended claims will be readily apparent to those skilled in the art.

What we claim is:

1. A swather for mounting on a tractor unit comprising;

a main frame structure including a front transverse member, a pair of rearwardly extending side members and an intermediate transverse member, said front transverse member having connecting means for detaching securing the front transverse member to the front of the tractor unit, said side members being secured at forward ends thereof to said front transverse member and being spaced to be disposed on opposite sides of said tractor unit, said intermediate transverse member having connecting means between opposite ends thereof for detachably securing said intermediate transverse member beneath said tractor unit, said intermediate transverse member being secured at outer ends therof to said side members, a front swather head carried solely by said front transverse member, at least one side swather head having an inner end carried by one of said side members at a point rearward of said front transverse member, mounting means connecting said side swather head to said one side member for swinging said side swather head between an operative position wherein said side swather head projects outwardly from said one side member and the inner end thereof is located behind and substantially in line with an outer end of said front swather head and a travel position wherein said side swather head is substantially parallel to the direction of travel of said tractor unit, a rear frame structure for attachment to said tractor unit and providing a strut connecting means rearwardly of said side swather head mounting means, and a rigid strut member in an operative position being connected at a rear end to said strut connecting means and extending forwardly to a connection means on said side swather head located outwardly of the side swather head mounting means when said side swather head is in the operative position.

2. A swather as defined in claim 1, wherein said mounting means of said side swather head includes pivot means providing a substantially vertical hinge axis for said side swather head adjacent said one side frame member for permitting swinging movement of said side swather head at least through approximately 90 degrees, said side swather head in said operative position projecting substantially at right angles relative to said one side member and in said travel position being adjacent to and substantially parallel to said one side member.

3. A swather as defined in claim 2 wherein said strut member is removably connectable into the operative position between the connecting means of said rear frame structure and said side swather head, said strut in said operative position providing a compression link during forward travel of said swather to thereby prevent said side swather head from swinging to said travel position.

4. A swather as defined in claim 3, wherein said mounting means of said side swather head includes hydraulic cylinder means actuable to swing said side swather head from said travel position to said operative position.

5. A swather as defined in claim 4 wherein said strut member is freely extendable from a compression link condition to at least a limited elongated condition, and said hydraulic cylinder is actuable to swing said side swather head forward from said operative position.

6. A swather as defined in claim 5, wherein said strut member includes a pair of elongated members, one telescoped within the other, and means limiting the travel of said one elongated member into the other so as to define a specific minimum length of said strut member.

7. A swather as defined in claim 6, wherein said limiting means includes a diametrically extending pin affixed to one of said elongated members, the other of said elongated members having longitudinal slots receiving said pin.

8. A swather as defined in claim 3, wherein the connecting means at either end of said strut member includes a pivoted joint.

9. A swather as defined in claim 8, wherein at least one of said pivoted joints includes a removable pivot pin to thereby permit disconnection of said strut member from the connection means.

10. A swather as defined in claim 4, wherein said hydraulic cylinder means includes is pivotally connected at one end to said one side member of said main frame and at the other end therof to said side swather head.

11. A swather as defined in claim 10, wherein the point of connection of the hydraulic cylinder to said side member is forward of said mounting means of said side swather head, whereby said side swather head is moved to said travel position on expansion of said hydraulic cylinder and to the operative position on contraction of said hydraulic cylinder.

12. A swather as defined in claim 11, wherein said side swather head reaches the position in which it projects at substantially right angles to said one side member before said hydraulic cylinder is fully contracted.

13. A swather as defined in claim 2, wherein the connecting means on said side swather head is disposed forward and laterally outward of the connection means of said rear frame structure when said side swather head is in the operative position whereby said strut member extends diagonally forward from the connecting means of said rear frame structure.

14. A swather as defined in claim 13, wherein said side member of said main frame structure has a rear end portion extending rearwardly of said mounting means of said side swather head, said rear frame structure including said rear end portion and a stabilizer member for connection of said rear end portion to said tractor unit rearwardly of the connection means of said intermediate transverse member of said main frame.

15. A swather as defined in claim 14, wherein said rear end portion of said side member extends rearwardly a distance sufficient to be located rearward of the rear wheels of a conventional tractor, and said stabilizer member includes a elongated rigid member connected at a rear end to said rear end portion and having connection means at a forward end for connection to a rear part of said tractor.

16. A swather as defined in claim 15, wherein said stabalizer member includes a pivot connection between said rear end and said rear end portion of said side member for permitting swinging of said stabalizer member about a vertical axis, said connection means at the forward end thereof having means for connection to a drawbar of the tractor.

17. A swather as defined in claim 1, and further including a conveyor means for delivery of material from an inner end of a bed of said side swather head to to a bed of said front swather head.

* * * * *